United States Patent
Hamlin et al.

(10) Patent No.: US 11,983,565 B2
(45) Date of Patent: May 14, 2024

(54) PLATFORM FRAMEWORK CONFIGURATION STATE MANAGEMENT

(71) Applicant: Dell Products, L.P., Round Rock, TX (US)

(72) Inventors: Daniel L. Hamlin, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 492 days.

(21) Appl. No.: 17/355,321

(22) Filed: Jun. 23, 2021

(65) Prior Publication Data

US 2022/0413922 A1  Dec. 29, 2022

(51) Int. Cl.
  *G06F 9/50* (2006.01)
  *G06F 9/54* (2006.01)
  *G06Q 10/10* (2023.01)

(52) U.S. Cl.
  CPC ........... *G06F 9/5027* (2013.01); *G06F 9/542* (2013.01); *G06Q 10/10* (2013.01)

(58) Field of Classification Search
  None
  See application file for complete search history.

(56) References Cited

U.S. PATENT DOCUMENTS

| | | | | |
|---|---|---|---|---|
| 8,738,961 B2* | 5/2014 | Jain | ..................... | G06F 11/2028 714/4.11 |
| 10,089,147 B2* | 10/2018 | Jamjoom | .............. | G06F 9/5011 |
| 11,347,566 B2* | 5/2022 | Iyer | .......................... | G06F 9/541 |
| 11,513,813 B2* | 11/2022 | Hamlin | .................. | G09G 5/363 |
| 2006/0155564 A1* | 7/2006 | Fisher | .................... | G06Q 10/06 705/7.11 |
| 2009/0182605 A1* | 7/2009 | Lappas | .................. | G06Q 10/06 709/206 |
| 2012/0144392 A1* | 6/2012 | Freitas | .................. | G06F 1/3287 718/100 |
| 2017/0155672 A1* | 6/2017 | Muthukrishnan | ....... | H04L 67/02 |

(Continued)

OTHER PUBLICATIONS

Czajkowski et al.; "Grid Information Services for Distributed Resource Sharing"; 2001 IEEE; (Czajkowski_2001.pdf; pp. 181-194) (Year: 2001).*

*Primary Examiner* — Hiren P Patel
(74) *Attorney, Agent, or Firm* — Fogarty LLP (57) ABSTRACT

Embodiments of systems and methods for platform framework configuration state management are described. A platform framework of an IHS (Information Handling System) generates a resource dependency graph based on registrations of a plurality of platform framework participants, wherein the registrations of the participants specify use of resources accessed via the platform framework. A change in context of operation of the IHS is determined. Based on the context change, a change is determined in the availability of resources accessed via the platform framework. Based on the resource dependency graph, registered participants are identified that are affected by the change in platform framework resource availability. The affected participants are notified of the change in platform framework resource availability. In some embodiments, the registrations of the participants may specify a communication handle for notifying the participant of changes in the resource dependency graph.

18 Claims, 4 Drawing Sheets

(56) References Cited

U.S. PATENT DOCUMENTS

| | | | |
|---|---|---|---|
| 2018/0331928 A1* | 11/2018 | Dave | H04L 67/10 |
| 2019/0251281 A1* | 8/2019 | Freedman | G06F 21/10 |
| 2022/0019476 A1* | 1/2022 | Sanchez | G06F 16/9024 |
| 2022/0060431 A1* | 2/2022 | Vadayadiyil Raveendran | H04L 41/147 |
| 2022/0179707 A1* | 6/2022 | Jreij | G06F 9/5005 |
| 2022/0365835 A1* | 11/2022 | Kandasamy | G06F 11/0793 |

* cited by examiner

PLATFORM FRAMEWORK CONFIGURATION STATE MANAGEMENT

FIELD

The present disclosure relates generally to Information Handling Systems (IHSs), and more particularly, to systems and methods for supporting the use of various internal components of IHSs.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for platform framework configuration state management are described. In an illustrative, non-limiting embodiment, an Information Handling System (IHS) may include a plurality of hardware devices, each comprising a plurality of resources that are accessed via a platform framework of the IHS. IHS embodiments may further include a processor and a memory coupled to the processor, the memory having program instructions stored thereon that, upon execution, cause the platform framework to: generate a resource dependency graph based on registrations of a plurality of platform framework participants, wherein the registrations of the participants specify use of one or more of the plurality of resources accessed via the platform framework; determine a change in context of operation of the IHS; identify, based on the context change of the operation of the IHS, a change in availability of one or more of the resources accessed via the platform framework; identify, based on the resource dependency graph, one or more registered participants affected by the change in platform framework resource availability; and notify the affected participants of the change in platform framework resource availability.

In additional IHS embodiments, the generation of the resource dependency graph comprises program instructions that cause the platform framework of the IHS to: receive registrations by the participants for use of platform framework resources, wherein each respective registration comprises configurations of the platform framework resources that are approved for use by the participants; validate the received registration by evaluating the approved configurations against configuration information included in the resource dependency graph; and when the approved configurations are validated, add the use the platform framework resources registered by the participants to the resource dependency graph. In additional IHS embodiments, the registrations of the participants further specify a communication handle for notifying the registering participants of changes in the resource dependency graph. In additional IHS embodiments, the change in context of the operation of the IHS comprises a change in a security posture of the IHS, and wherein the change in availability of one or more of the resources accessed via the platform framework comprises a change in availability of a processor core for offloading computing tasks. In additional IHS embodiments, the processor core for offloading computing tasks comprises a processor core of a LCH (Lid Controller Hub). In additional IHS embodiments, the change in context of the operation of the IHS comprises a change in location of the IHS. In additional IHS embodiments, the change in location of the IHS comprises a change in a security posture of the IHS. In additional IHS embodiments, the change in availability of one or more of the resources accessed via the platform framework comprise a change in the availability of audio capabilities of the IHS that results from the change in security posture. In additional IHS embodiments, the change in context of the operation of the IHS comprises a change of a physical posture of the IHS. In additional IHS embodiments, the change in physical posture of the IHS comprises a change to a hinge angle of the IHS. In additional IHS embodiments, the change in context of the operation of the IHS comprises a change in a physical posture of the IHS, and wherein the change in availability of one or more of the resources accessed via the platform framework comprise a change to user presence detection capabilities of the IHS. In additional IHS embodiments, execution of the program instructions further causes the platform framework of the IHS to: update the resource dependency graph to reflect the change in availability of one or more of the resources accessed via the platform framework. In additional IHS embodiments, execution of the program instructions further causes the platform framework of the IHS to: receive an indication that the resource dependency graph has been validated as a known configuration of resources accessed via the platform framework. In additional IHS embodiments, the indication is automatically generated based on a duration of error-free IHS operations while using the resource dependency graph. In additional IHS embodiments, edges of the resource dependency graph comprise policies specifying conditions for trigging changes in availability of a platform framework resource.

In various additional embodiments, memory storage devices include program instructions stored thereon that, upon execution by an Information Handling System (IHS) comprising a plurality of hardware devices, each comprising a plurality of resources that are accessed via a platform framework of the IHS, causes the IHS to: generate a resource dependency graph based on registrations of a plurality of platform framework participants, wherein the registrations of the participants specify use of one or more of the plurality of resources accessed via the platform framework; determine a change in context of operation of the IHS; identify, based on the context change of the operation of the IHS, a change in availability of one or more of the resources accessed via the platform framework; identify, based on the resource dependency graph, one or more registered participants affected by the change in platform framework resource availability; and notify the affected participants of the change in platform framework resource availability. In additional storage device embodiments, the registrations of the participants further specify a communication handle for notifying the registering participant of changes in the resource dependency graph. In additional storage device embodiments, the change in context of the operation of the IHS comprises a change a physical posture of the IHS.

In various additional embodiments, methods are provided for managing a plurality of resources that are accessed via a platform framework of an IHS (Information Handling System). The methods may include: generating a resource dependency graph based on registrations of a plurality of platform framework participants, wherein the registrations of the participants specify use of one or more of the plurality of resources accessed via the platform framework; determining a change in context of operation of the IHS; identifying, based on the context change of the operation of the IHS, a change in availability of one or more of the resources accessed via the platform framework; identifying, based on the resource dependency graph, one or more registered participants affected by the change in platform framework resource availability; and notifying the affected participants of the change in platform framework resource availability. In additional method embodiments, the registrations of the participants further specify a communication handle for notifying the registering participant of changes in the resource dependency graph.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
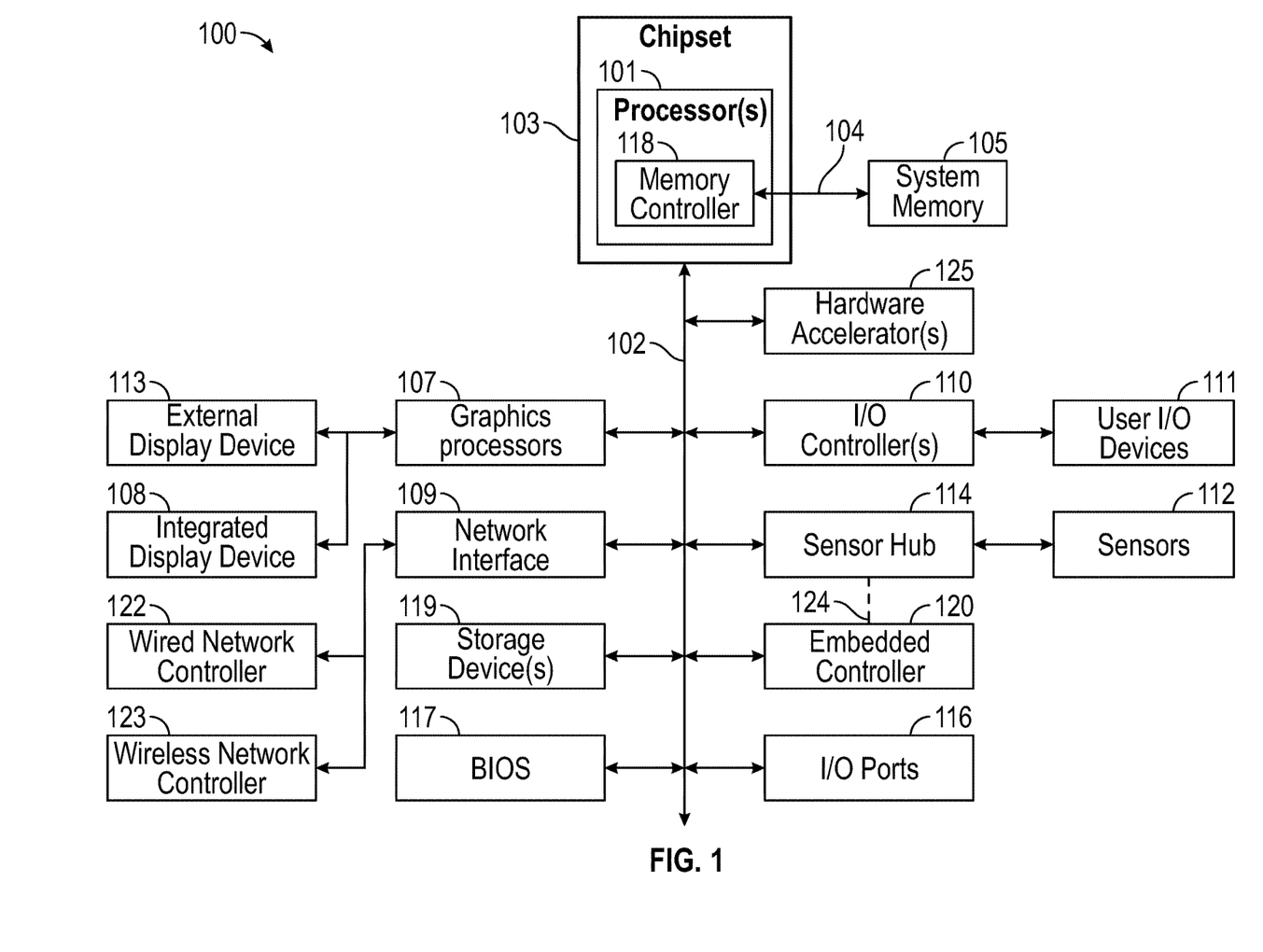
FIG. 1 is a block diagram of an example of hardware components of an Information Handling System (IHS) configured to support management of configuration states for platform framework resources of the IHS, according to some embodiments.

FIG. 1 is a block diagram illustrating components of IHS 100 configured to support management of configuration states for platform framework resources of the IHS 100. As shown, IHS 100 includes one or more processor(s) 101, such as a Central Processing Unit (CPU), that execute code retrieved from system memory 105. Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102. In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at predetermined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

As described in additional detail below, in some embodiments, EC 120 may perform various functions to verify the integrity of IHS 100 and its hardware components prior to initialization of the IHS 100 (i.e., in a bare-metal state). For instance, EC 120 may calculate hash value signatures based on instructions and other information used to configure and operate hardware and/or software components of IHS 100, thus validating these components. For example, EC 120 may calculate a hash value based on firmware and on other instructions or settings utilized by a hardware component of IHS 100, such that the hardware component may be included within a root of trusted hardware of IHS 100. In some embodiments, the reference signatures used in such validations may be calculated and encoded in a secured storage of IHS 100 as part of a trusted manufacturing process of the IHS 100.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with 4 signatures or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
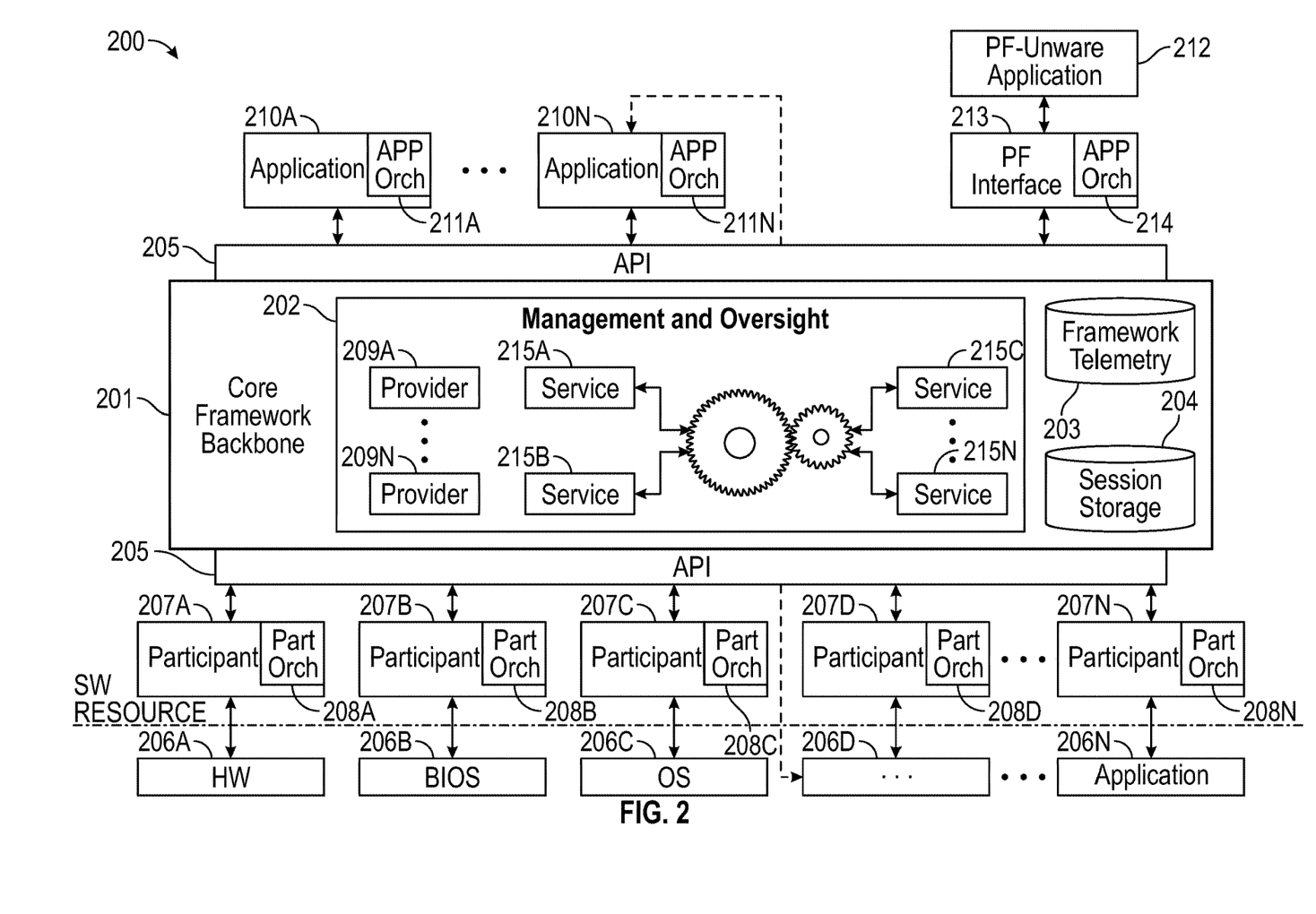
FIG. 2 is a block diagram illustrating an example of a platform framework deployed in an IHS in a manner that supports management of configuration states for platform framework resources, according to some embodiments.

FIG. 2 is a block diagram illustrating an example of platform framework 200 that may be configured to support management of configuration states for platform framework resources of an IHS. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.). In some implementations, platform framework 200 may be supported by and/or executed within an OS used by IHS 100, and it may be scaled across user and kernel spaces. Additionally, or alternatively, platform framework 200 may be provided as a software library or an ".exe" file. As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process. In some instances, the platform framework 200 may provide a handle received from a participant to other validated participants, thus supporting the ability for various types of participants to communicate directly with each other. For example, a handle provided to the platform framework 200 may include a reference to an IPC (Inter-Process Communications) resource of the IHS that is to be used in API communications supported by the participant providing the handle.

In various embodiments, platform framework 200 may include at least three different types of participants: producers, consumers, and providers. Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N (a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions. On the consumer side, each of consuming applications 210A-N (a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one of more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services. For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an I2C sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100. For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML, file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform networks may communicate with each other via an Interprocess Communication (IPC) resource specified in a handle provided by the workspace orchestration service for communications with the workspace(s) involved.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be complied, whereas the polic(ies)

that the code enforces may change at runtime (e.g., by a user's command in real time) and therefore may be considered "runtime objects."

Figure 3:
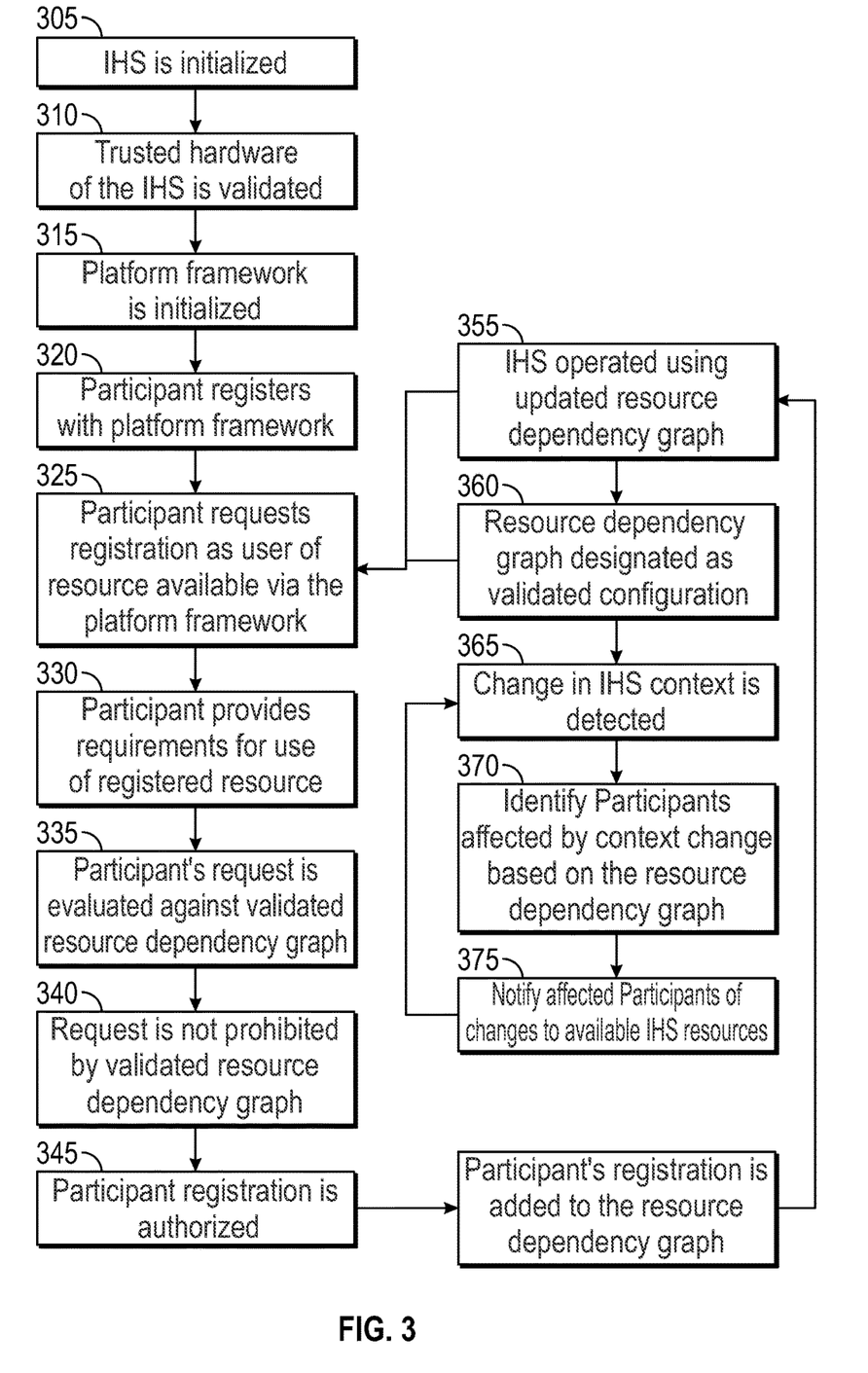
FIG. 3 is a flowchart illustrating an example of a method for supporting management of configuration states for platform framework resources of an IHS, according to some embodiments.

FIG. 3 is a flowchart illustrating an example of a method, according to various embodiments, for management of configuration states for platform framework resources of an IHS. Some embodiments may begin at block 305 with the initialization of an IHS, such as described with regard to FIG. 1. In some embodiments, procedures for initializing an IHS may include validation of various hardware components of the IHS, such as by the embedded controller of the IHS of FIG. 1. Accordingly, at block 310, the firmware instructions utilized by various hardware components may be validated against reference signatures for each respective component, thus confirming the hardware component is operating utilizing trusted instructions and is thus a trusted hardware component. Upon validating these hardware components such that they are included within a root of trust, an operating system of the IHS may be booted. With the operating system booted, at block 315, a platform framework for the IHS is initialized, where the platform framework provides a single interface for accessing various resources of the IHS, such as described with regard to FIG. 2.

With the platform framework initialized, various operations of the IHS may continue, which may include, at 320 of FIG. 3, the registration of various framework participants, such as described with regard to FIG. 2. As indicated at 325 of FIG. 3, the registration of a participant may also include a request for further registration as a user of one or more resources of the platform framework. In some embodiments, such resource registrations may be supported by an API of the platform framework, such as described with regard to FIG. 2. The resource registrations may include a variety of different types of participants requesting use of various types of resources that may be accessed via the platform framework. For instance, a user presence detection provider that has registered as a platform framework participant may then request further registration as a user of a camera resource that is provided via another platform framework participant. The user presence detection provider may also request further registration as a user of other sensors that will be utilized in presence detection, such as motion sensors and/or a time-of-flight sensors that have been registered as platform framework participants. In this scenario, a security application that has registered as a platform framework participant may request further registration as a user of this user presence detection provider. The security application may also request further registration as a user of other resources that will be utilized in implementing various security protocols, such as a fingerprint reader that has been registered as a platform framework participant.

As indicated at 330 of FIG. 3, the participant requesting further registration of a platform framework resource may also specify various requirements for its use of that particular resource. For instance, the user presence detection provider may specify one or more compatible versions of the software utilized by the camera resource. In such instances, the registration request of the user presence detection provider may specify versions of the camera firmware that are supported by the user presence detection capabilities, where the versions may include a minimum version of the firmware that must be utilized by the camera and may also specify a maximum version of the camera firmware that is currently supported by the user presence detection capabilities. In this same manner, the user presence detection provider may specify versions of the time-of-flight sensor firmware that are supported. In some instances, the supported version information may be specified by a participant in its registration request that is submitted to the platform framework along with a JSON file, XML, file or other structured information source. As described below, the structured information source provided during registration may include compatibility information and may also specify a handle for use communicating with the registering participant.

Based on the compatibility information received in the participant's registration request, at 335, the request is evaluated against a resource dependency graph, where nodes of this graph represent resources that are accessed via the platform framework and also represent participants that are registered users of each of these resources. As described in additional detail below, such a resource dependency graph may be generated as participants register as users of platform framework resources. Also as described below, a resource dependency graph may be validated, thus establishing that the resource dependency graph represents a known and tested set of resource configurations. Using such a validated resource dependency graph, the registration request received from the participant is evaluated for compatibility. For instance, in response to the user presence detection provider including version compatibility information for a camera or a time-of-flight sensor in its registration request, this version information is evaluated against the current version of the camera firmware that is in use, where this camera firmware information may be included in the camera node of the validated resource dependency graph or may be determined through queries supported by the camera node. At 340, this evaluation of resource compatibility results in a determination that the request is not prohibited due to incompatibility. For instance, the current camera firmware version specified by the camera node of the resource dependency graph is determined to be a version that is compatible with the supported versions that were specified in the user presence detection provider's registration request. In scenarios where the version information specified in the registration request is incompatible with the resource dependency graph, the participant's registration request may be denied, and a responsive error message may be returned to the participant.

In scenarios, where the participant's request is determined to be compatible with the validated resource dependency graph that is currently in use by the platform framework, at 345, the participant's registration as a user of resource may be authorized and the participant may be notified of the successful resource registration. At 350, the participant's registration is added to the resource dependency graph, such as described in additional detail with regard to FIG. 4. For instance, if the user presence detection provider's registration as a user of the camera resource is validated, a node corresponding to the user presence detection provider is added to the resource dependency graph, where the node includes a dependency on the camera node of the graph and where the node specifies the camera compatibility information provided by the user presence detection provider in its request.

As indicated at 355 of FIG. 3, with the participant's resource registration added to the resource dependency graph, various operations of the IHS may continue, which may include the registration of various additional framework participants, such as described with regard to FIG. 2. As illustrated in FIG. 3, in some scenarios, operation of the IHS may include the receipt, at 325, of additional participants requesting registration as users of a platform resource. As before, version information included in these additional requests is evaluated against the operative resource dependency graph in order to confirm compatibility, and a node corresponding to the requestor and resource dependency edges are added to the resource dependency graph. In this manner, the resource dependency graph may be iteratively constructed though the registration of participants as users of platform framework resources, while ensuring each received resource request is compatible with the resource versions in use by the operative resource dependency graph.

As describe above, in some embodiments, a resource dependency graph may be validated as a known IHS configuration that meets various operational requirements. For instance, in some embodiments, the platform framework may support a provider that receives inputs from an administrator that validates the current configuration of the IHS, and thus validates the operative resource dependency graph that is currently in use by the IHS. In such instances, a user may perform such validations through checkpoints, restore points or other such designations that are intended to specify an IHS configuration that has been verified as operating without errors or other issues. In some embodiments, a resource dependency graph may be validated through automated procedures that trigger a validation based on observed periods of error-free operation by the IHS, or periods where the observed errors are of relatively low importance. For instance, such automated procedures may be initiated based on monitoring of error messages propagated via the platform framework, where the operative resource dependency graph may be validated after observing no error messages, or a lack of certain types of error messages, for a specific duration after a new participant's resource registration has been added to the resource dependency graph. As illustrated in FIG. 3, in some scenarios, operation of the IHS according to a validated resource dependency graph may continue with the receipt, at 325, of additional participants requesting registration as users of a platform resource. As before, the received request is validated, but now against the version information included in the validated resource dependency graph.

With the IHS operating according to the validated resource dependency graph, various operations of the IHS may continue, which may include various types of changes to the context in which the IHS is operating. For instance, a change in the location of the IHS may constitute a change in the security context of the IHS that may result in various changes in the platform resources of the IHS that may be utilized. In such a scenario, a change from a secured corporate location to a public location may result in additional security requirements being initiated by network access resources of the IHS. In such instances, a change in location context may be reported to the platform framework by a registered provider that determines the IHS location based on various platform framework resources, such as a GPS sensor, a Bluetooth controller, and/or a Wi-Fi network controller. In this example, the use of these various sensors by the location context provider would be reflected in the resource dependency graph. In another example, a change in context of the operation of an IHS may result from changing the physical configuration of an IHS, such as a convertible dual-panel IHS that may be transformed from a traditional laptop configuration to a tablet configuration and to various other postures, such as described with regard to FIG. 1. In such instances, a change in the physical posture of the IHS may be detected by a posture detection provider that bases posture determinations on information provided by platform framework resources, such as a hinge-angle sensor and a gyroscope. In this example, the use of these various sensors by the posture detection provider would also be reflected in the resource dependency graph.

An additional type of context information that may affect the operation of an IHS may be use of the IHS to access protected data or a protected software application. For instance, a user may select a spreadsheet, drawing, document, or other file that has been designated as including protected data. A user may also initiate operation of an application that has been designated as protected, such as an accounting application, an email client, or a security application. A user may also launch a workspace, such as described with regard to FIG. 1, that has been designated for use in accessing secure information. In some embodiments, a platform framework participant may monitor for a user accessing a file, application, workspace, or other resource that triggers a change in the context of the operation of the IHS. In such embodiments, a participant may determine a resource is being accessed based on information provided by the operating system of the IHS, by a remote workspace orchestrator, by an embedded controller, such as the described with regard to FIG. 1 of the IHS, and/or by hardware components of the IHS, such as from a storage controller of the IHS reporting a particular secure storage drive is being accessed.

Figure 4:
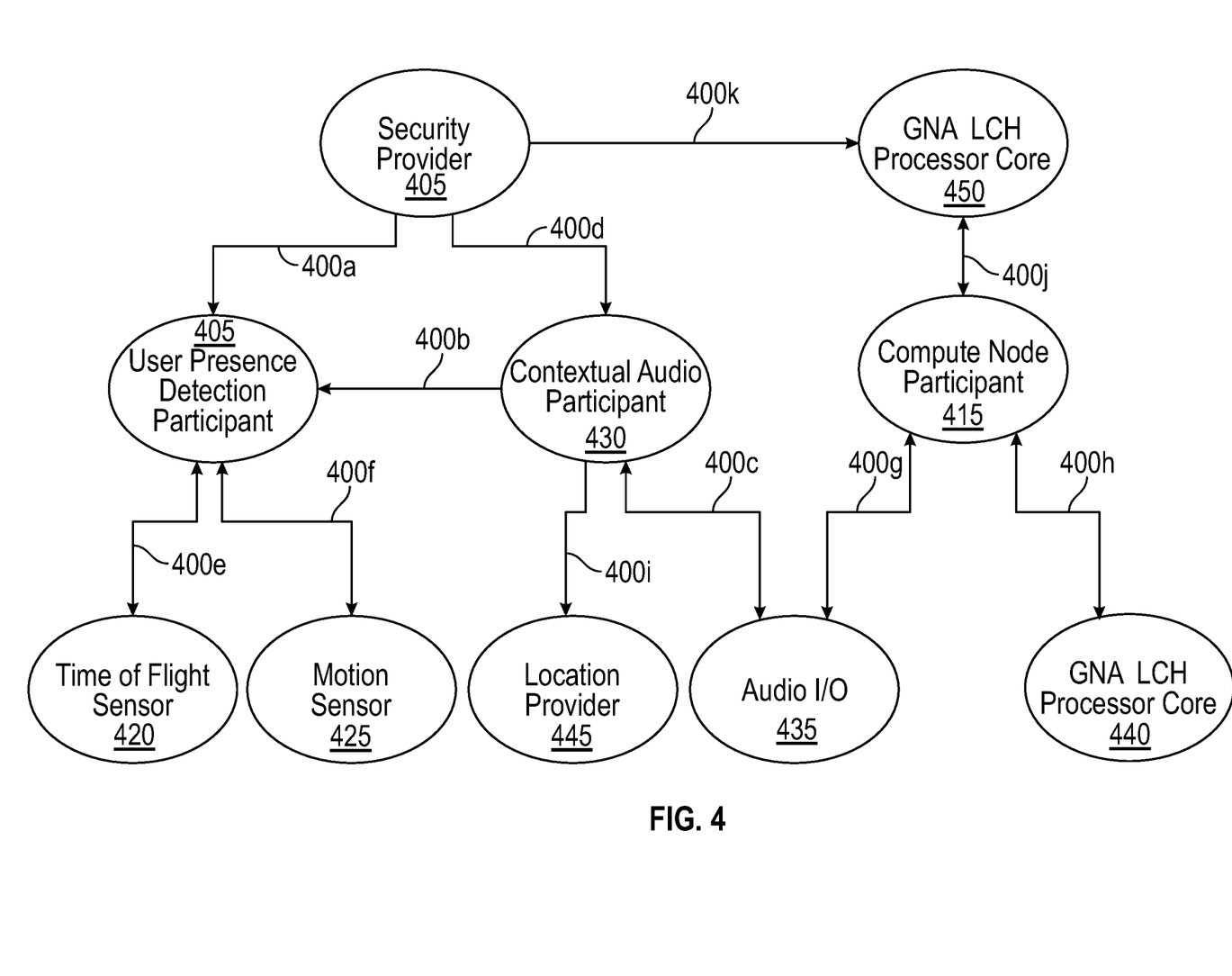
FIG. 4 is a message diagram illustrating certain operations of components of an IHS that are configured to support management of configuration states for platform framework resources of an IHS, according to some embodiments.

In response to detecting a change in context of the operation of the IHS, the platform framework may identify any changes in resource availability that result from that particular context change. In some embodiments, such a determination may be made based on information encoded in the resource dependency graph. As illustrated in FIG. 4, a resource dependency graph includes nodes corresponding to the platform framework resources and to platform framework participants relying on each resource, whether directly or indirectly. Dependencies between a participants and resources are indicated by an edge between the nodes of the participant and the resource. As described, participants may specify compatibility information that may be used to establish the validity of the current configuration, such as to ensure the current firmware in use by a resource is compatible with compatible versions specified by the participant. Accordingly, the validity of an edge in the resource dependency graph may depend on validating such compatibility information.

In a similar manner, policies enforced by the platform framework may be associated with edges of the resource dependency graph. In some embodiments, the requests for registration as user of a platform resource received from participants, at 325, may also specify one or more policies with the request. Whether provided in its resource registration request or provided separately after the resource registration has been approved, the participant may specify or more policies for which the requested resource dependency will be valid. For example, a software application participant requesting use of a camera resource of the IHS may specify that use of the camera will only be allowed while the IHS is configured in certain physical postures, such as in a traditional laptop posture or a tablet posture, where such restrictions may be specified in a policy specified by the participant, or where such restrictions may be specified in a more specific posture policy that pertains strictly to changes in IHS operations that are triggered by posture changes. In this same manner, a user presence detection provider requesting use of a motion sensor may provide a security policy that specifies that use of the motion sensor will only be allowed when the user is in a low-risk security environment, thus preventing the use of motion to establish that a user is in proximity to the IHS while the IHS is located in a high-risk environment.

As describe with regard to FIG. 1, IHSs may support containerized workspaces that provide computing environments on an IHS in isolation from the underlying hardware of the IHS. As described, the operation of such workspaces may be specified in a workspace definition that may be provided by a remote orchestration layer, where the workspace definition identifies the security restrictions and productivity tools for a particular workspace based on the security and productivity context of the hardware and software of an IHS, the user, the physical environment, the data being accessing, etc. In some embodiments, a workspace definition may specify resource dependencies that will be registered with the platform framework, such as a workspace definition specifying use of a fingerprint authentication resource that is accessed via the IHS. In some embodiments, the workspace definition may alternatively or additionally specify policies to be associated with the resource dependency. For instance, a workspace definition may specify a posture policy that specifies that the fingerprint reader will only be used while the IHS is configured in a traditional laptop posture, but not while configured in a tablet posture. Accordingly, the workspace definition may additionally request use of a camera resource and may further specify in a provided posture policy that the camera resource will only be allowed for use in authentication while in the tablet posture and the camera will not allowed for use in authentication while in a tent posture.

Once the change in IHS context has been detected, at 370, the resource dependency graph may be consulted in order to determine any changes in resource availability that result from the context change. In particular, the context change may be evaluated against the security policies associated with each of the edges of the resource dependency graph. For instance, a change in posture will be evaluated against all posture policy dependencies that are present in the resource dependency graph. A change in location will be evaluated against all location policy dependencies present in the resource dependency graph. Through evaluation of these polices, any changes to the dependency graph are identified. For instance, based on a change in location context, the edges of the resource dependency graph may be evaluated and may identify resources, such as audio I/O resources, that are disabled in certain locations, such as in public locations.

In scenarios where changes to the resource dependencies are triggered by a change in the IHS context, the resource dependency graph is used to determine the participants that have registered as users of the resources that are affected by the change in context. For instance, the user presence detection provider relying on the motion sensor is identified as a participant relying on the motion sensor based on the resource dependency graph, where the edge connecting the user presence detection provider to the motion sensor resource in the resource dependency graph may have specified a location policy prohibiting use of the motion sensor in public locations. At 375, the platform framework may then proceed to provide each of the participants that depend on the effected resource with a notification of the change in availability of the resource. In response to such notifications, the participants may adjust their operations to compensate for the change in resource availability.

An example of changes in resource availability is provided with regard to FIG. 4, which illustrates certain aspects of a resource dependency graph utilized, according to various embodiments, to support management of configuration states for platform framework resources of an IHS. In the example of FIG. 4, four platform resources 420, 425, 435, 440 have registered as platform framework participants, such as registration as producers that support communications between the resource hardware/firmware and the platform framework. In some embodiments, such registrations may occur as part of the initialization of the platform framework, such as described with regard to FIGS. 2 and 3. In particular, a time-of-flight sensor 420 has registered as a resource available through a platform framework. A motion sensor 425 has also registered as a platform framework resource. The audio I/O capabilities 435 an IHS may be registered for use by platform framework participants through a producer that interfaces with the audio drivers of the IHS. As described with regard to FIG. 1, an IHS according to embodiments may include one or more GNA processor cores that may be located within various processors of the IHS, such as the main processor, the processor of a remote access controller, a graphics controller and an audio controller. In the illustrated embodiment, such a GNA processor core 440 that is implemented using processing capabilities of an audio controller is registered for use by platform framework participants.

In utilizing the process offloading capabilities provided using the GNA processor core 440, a compute node 415 may register as a platform framework participant and may further register as a user of the audio processor GNA processor core 440, thus establishing edge 400h of the resource dependency graph. As indicated via edge 400g, computer node 415 may also register as a user of audio I/O capabilities 435 supported by the platform framework. In such embodiments, the computer node 415 may utilize its registration as a user of audio I/O 435 in order to determine whether any audio I/O capabilities are currently in use. If the audio I/O provider 435 reports that no audio I/O operations are currently being conducted, the compute node 415 may utilize the GNA processor core 440 of the audio controller, since this processor core is not in use in any audio processing.

As described above, changes in the context of the operation of the IHS may result in changes to availability of IHS resources. For instance, upon moving from a low-risk environment, such as a home location or a work location, to a high-risk environment, such as a public coffee shop, audio I/O capabilities may be disabled, thus mitigating the risk of individuals other than the user of the IHS utilizing audio commands support by digital assistants, and also mitigating the risk of audio outputs accidently disclosing protected information in a public area. In such an embodiment, a contextual audio participant 430 may rely on a registration with location provider 445, indicated via edge 400i, to provide such location information and may interface with the I/O capabilities 435 to enable and disable audio based on the location information, as indicated via dependency 400c. In some embodiments, the location-dependent changes to the audio capabilities may be specified as policies associated with dependency edge 400c of the resource dependency graph, where the policy may be a location policy that specifies various types of locations for which the contextual audio participant 430 will enable, disable, or otherwise configure the audio I/O capabilities 435.

In a scenario where audio I/O 435 is disabled by contextual audio participant 430, the illustrated resource dependency graph may be utilized to determine all participants that should be notified of the disabling of audio capabilities, such as the identification of participants at 370 of FIG. 3. Through evaluation of the dependency edges terminating at node 435 of the resource dependency graph, the compute node 415 is identified as having registered a dependency on the audio I/O capabilities, and may thus be notified of the disabling of audio I/O. In response to such a notification, the compute node 415 may initiate use of the GNA processor core 440 that is implemented using the audio controller. In this manner, the resource dependency graph may be used to track resource dependencies and to determine participants to be notified in response to changes in context that affect the availability of platform framework resources. In some embodiments, a change in resource availability that affects a dependency, such as the disabling of audio I/O, may be reflected through updates to the resource dependency graph. In the scenario where the audio I/O is disabled, edge 400g would be updated to indicate that the dependency on this capability is not presently enabled.

As illustrated in FIG. 4, compute node 415 may also utilize a GNA processor core 450 implemented using processing capabilities of a Lid Controller Hub (LCH) that is located in a lid panel of laptop IHS and that may be utilized to implement various imaging and audio capabilities, such as use of a camera, speaker and/or microphone installed in the lid panel. As indicated by edge 400j of the resource dependency graph, compute node 415 may offload computing tasks to the LCH processor core. However, in some embodiments, a context change that results in the IHS being in a high-security context may result in the LCH being disabled, thus reducing the attack surface presented by the IHS. In the illustrated embodiment, a security provider 405 may implement such security policies, which may be indicated in dependency edge 400k through which the security provider 405 is connected to the GNA processor core of the LCH. Upon detecting a change to a high-risk posture, security provider 405 may evaluate a security policy associated with edge 400k to determine that, in this high-risk posture, GNA processor core 450 of the LCH is to be disabled. Embodiments also evaluate all edges terminating at the node of the disabled processor core 450 of the LCH in identifying compute node 415 as a participant to be notified, thus preventing compute node 415 from any further offloading of computing tasks to the LCH processor core.

Also illustrated in FIG. 4 is a user presence detection provider 410 that may rely on a registration with time-of-flight sensor producer 420, as indicated via edge 400e, to provide information that will be utilized in presence detection. User presence detection provider 410 may also rely on motion sensor 425 for additional information utilized in presence detection, as indicated via dependency 400f. In the illustrated embodiment, security provider 405 has registered, per edge 400a of the resource dependency graph, as a user of the user presence detection provider 410 and as user of contextual audio capabilities 430, per edge 400d, in implementing security protocols that prohibit use of contextual audio 430 in various scenarios, such as disabling audio inputs and outputs when multiple individuals are detected in proximity to the IHS while the user is accessing protected information. However, in response to a change in posture of an IHS from a traditional laptop posture to a tent poster, time-of-flight sensor 420 of the IHS may be disabled to its poor orientation in this posture.

In response to disabling of time-of-flight sensor 420, the resource dependency graph may be used to identify the user presence detection provider 410 as a registered user of this sensor. In turn, the resource dependency graph may be further used to identify security provider 405 and contextual audio 430 as dependent on the user presence detection provider 410. The user presence detection provider 410 may then be notified of the disabling of the time-of-flight sensor 420. As a result of this particular sensor loss, the capabilities of user presence detection provider 410 may be limited, such as the loss of any ability to determine when multiple individuals are present in proximity to the IHS. The contextual audio provider 430 may then be notified of this loss in the capabilities of the user presence detection provider 410. In response, the contextual audio provider 430 may adjust its operations to continue providing contextual audio with the more limited motion sensing presence detection capabilities that are still supported by the user presence detection provider. The notification of the inability to detect multiple individuals is also provided to the security provider 405, which may then result in disabling of the capability to configure contextual audio based on whether multiple individuals are detected in proximity to the IHS.

In addition to tracking the dependencies between platform framework components, the resource dependency graph may also maintain capabilities that may be used for notifying participants of pertinent changes within the resource dependency graph. For instance, each of the edges 400a-k that connect nodes of the resource dependency graph may include communication handles for use by the platform framework in notifying registered participants of changes to a portion of the resource dependency graph on which that participant is dependent, either directly or indirectly. In some embodiments, such communication handles may be specified by a participant through their registration as users of a platform framework resources, such as at 325 of FIG. 3. In such a registration, the participant may submit a structured file, such as a JSON file, that specifies various aspects of the registration request, including specifying a communication handle for use in notifying the participant of changes to the resource dependency graph. In such embodiments, the structured file may also specify an API that is supported by the communication handle, thus providing the platform framework with capabilities for determining the resource dependency graph notifications the are supported by each participant.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (NIS), comprising:
a plurality of hardware devices, each comprising a plurality of resources that are accessed via a platform framework of the IHS;
a processor; and
a memory coupled to the processor, the memory having program instructions stored thereon that, upon execution, cause the platform framework of the IHS to:
generate a resource dependency graph based on registrations of a plurality of platform framework participants, wherein the registrations of the participants specify use of one or more of the plurality of resources accessed via the platform framework;
determine a change in context of operation of the IHS, wherein the context change comprises a change in a security posture of the IHS;
identify, based on the context change of the operation of the IHS, a change in availability of one or more of the resources accessed via the platform framework, wherein the change in availability of one or more of the resources accessed via the platform framework comprise a change in availability of a processor core for offloading computing tasks, wherein the processor core for offloading computing tasks comprises a processor core of a LCH (Lid Controller Hub);
identify, based on the resource dependency graph, one or more registered participants affected by the change in platform framework resource availability; and
notify the affected participants of the change in platform framework resource availability.

2. The IHS of claim 1, wherein the generation of the resource dependency graph comprises program instructions that cause the platform framework of the IHS to:
receive registrations by the participants for use of platform framework resources, wherein each respective registration comprises configurations of the platform framework resources that are approved for use by the participants;
validate the received registration by evaluating the approved configurations against configuration information included in the resource dependency graph; and
when the approved configurations are validated, add the use the platform framework resources registered by participants to the resource dependency graph.

3. The IHS of claim 1, wherein the registrations of the participants further specify a communication handle for notifying the respective participants of changes in the resource dependency graph.

4. The IHS of claim 1, wherein the change in the context of the operation of the IHS comprises a change in location of the IHS.

5. The IHS of claim 4, wherein the change in location of the IHS results in the change in security posture of the IHS.

6. The IHS of claim 5, wherein the change in availability of one or more of the resources accessed via the platform framework comprise a change in availability of audio capabilities of the IHS that results from the change in security posture.

7. The IHS of claim 1, wherein the change in context of the operation of the IHS comprises a change of a physical posture of the IHS.

8. The IHS of claim 7, wherein the change in physical posture of the IHS comprises a change to a hinge angle of the IHS.

9. The IHS of claim 1, wherein the change in context of the operation of the IHS comprises a change in a physical posture of the IHS, and wherein the change in availability of one or more of the resources accessed via the platform framework comprise a change to user presence detection capabilities of the IHS.

10. The IHS of claim 1, wherein execution of the program instructions further causes the platform framework of the IHS to:
update the resource dependency graph to reflect the change in availability of one or more of the resources accessed via the platform framework.

11. The IHS of claim 1, wherein execution of the program instructions further causes the platform framework of the IHS to:
receive an indication that the resource dependency graph has been validated as a known configuration of resources accessed via the platform framework.

12. The IHS of claim 11, wherein the indication is automatically generated based on a duration of error-free IHS operations while using the resource dependency graph.

13. The IHS of claim 1, wherein edges of the resource dependency graph comprise policies specifying conditions for trigging changes in availability of a platform framework resource.

14. A non-transitory memory storage device having program instructions stored thereon that, upon execution by an Information Handling System (IHS) comprising a plurality of hardware devices, each comprising a plurality of resources that are accessed via a platform framework of the IHS, cause the IHS to:
generate a resource dependency graph based on registrations of a plurality of platform framework participants, wherein the registrations of the participants specify use of one or more of the plurality of resources accessed via the platform framework;

determine a change in context of operation of the IHS, wherein the context change comprises a change in a security posture of the IHS;

identify, based on the context change of the operation of the IHS, a change in availability of one or more of the resources accessed via the platform framework, wherein the change in availability of one or more of the resources accessed via the platform framework comprise a change in availability of a processor core for offloading computing tasks, wherein the processor core for offloading computing tasks comprises a processor core of a LCH (Lid Controller Hub);

identify, based on the resource dependency graph, one or more registered participants affected by the change in platform framework resource availability; and notify the affected participants of the change in platform framework resource availability.

15. The memory storage device of claim 14, wherein the registrations of the participants further specify a communication handle for notifying the registering participant of changes in the resource dependency graph.

16. The memory storage device of claim 14, wherein the change in context of the operation of the IHS comprises the change in physical posture of the IHS.

17. A method for managing a plurality of resources that are accessed via a platform framework of an IHS (Information Handling System), the method comprising:

generating a resource dependency graph based on registrations of a plurality of platform framework participants, wherein the registrations of the participants specify use of one or more of the plurality of resources accessed via the platform framework;

determining a change in context of operation of the IHS, wherein the context change comprises a change in a security posture of the IHS;

identifying, based on the context change of the operation of the IHS, a change in availability of one or more of the resources accessed via the platform framework, wherein the change in availability of one or more of the resources accessed via the platform framework comprise a change in availability of a processor core for offloading computing tasks, wherein the processor core for offloading computing tasks comprises a processor core of a LCH (Lid Controller Hub);

identifying, based on the resource dependency graph, one or more registered participants affected by the change in platform framework resource availability; and notifying the affected participants of the change in platform framework resource availability.

18. The method of claim 17, wherein the registrations of the participants further specify a communication handle for notifying the registering participant of changes in the resource dependency graph.

* * * * *

UNITED STATES PATENT AND TRADEMARK OFFICE
CERTIFICATE OF CORRECTION

PATENT NO. : 11,983,565 B2
APPLICATION NO. : 17/355321
DATED : May 14, 2024
INVENTOR(S) : Daniel L. Hamlin and Vivek Viswanathan Iyer Page 1 of 1

It is certified that error appears in the above-identified patent and that said Letters Patent is hereby corrected as shown below:

In the Claims

In Column 23 Line 32 Claim 1, delete "An Information Handling System (NIS), comprising:" and insert --An Information Handling System (IHS), comprising:-- therefor.

Signed and Sealed this
Twenty-third Day of July, 2024

Katherine Kelly Vidal
*Director of the United States Patent and Trademark Office*